(12) United States Patent
Lavie

(10) Patent No.: US 8,819,996 B2
(45) Date of Patent: Sep. 2, 2014

(54) DOOR PROTECTION DEVICE

(75) Inventor: Maxime Lavie, Nailloux (FR)

(73) Assignee: Airbus, Blagnac (FR)

( * ) Notice: Subject to any disclaimer, the term of this patent is extended or adjusted under 35 U.S.C. 154(b) by 587 days.

(21) Appl. No.: 12/301,856

(22) PCT Filed: May 22, 2007

(86) PCT No.: PCT/FR2007/000861
§ 371 (c)(1),
(2), (4) Date: Nov. 21, 2008

(87) PCT Pub. No.: WO2007/135291
PCT Pub. Date: Nov. 29, 2007

(65) Prior Publication Data
US 2010/0218428 A1 Sep. 2, 2010

Related U.S. Application Data

(60) Provisional application No. 60/807,937, filed on Jul. 21, 2006.

(30) Foreign Application Priority Data

May 22, 2006 (FR) ...................................... 06 04563

(51) Int. Cl.
*E06B 3/30* (2006.01)
(52) U.S. Cl.
USPC ....................... 49/460; 49/125; 49/127; 49/70
(58) Field of Classification Search
USPC .......... 49/483.1, 125, 367, 70, 460, 127–130; 16/82, 86 R
See application file for complete search history.

(56) References Cited

U.S. PATENT DOCUMENTS

| | | | | |
|---|---|---|---|---|
| 671,786 A * | 4/1901 | Allison | ........................ | 49/483.1 |
| 975,337 A * | 11/1910 | Dumont | ........................ | 49/483.1 |
| 1,050,981 A * | 1/1913 | Muehlberg | ........................ | 49/400 |
| 1,090,562 A * | 3/1914 | Orr et al. | ........................ | 160/192 |
| 1,211,480 A * | 1/1917 | Newton | ........................ | 16/85 |
| 1,270,869 A * | 7/1918 | Relling | ........................ | 49/483.1 |
| 1,842,734 A * | 1/1932 | Saives | ........................ | 16/86 A |
| 1,859,712 A * | 5/1932 | O'Connor | ........................ | 49/367 |
| 1,878,365 A * | 9/1932 | Barrows | ........................ | 49/215 |
| 2,453,049 A * | 11/1948 | Triller | ........................ | 16/82 |

(Continued)

FOREIGN PATENT DOCUMENTS

DE       43 21 188       2/1995

OTHER PUBLICATIONS

Chinese Office Action and Search Report dated Apr. 22, 2013, in corresponding Chinese patent application No. 200780018588.1 filed on May 22, 2007.

*Primary Examiner* — Katherine Mitchell
*Assistant Examiner* — Marcus Menezes
(74) *Attorney, Agent, or Firm* — Oblon, Spivak, McClelland, Maier & Neustadt, L.L.P.

(57) ABSTRACT

A door protection device pivoting about an axis and being applied against a wall when in the open position includes a portion added on to outside surface of the door and a portion added on to the wall, so that, in the open position of the door, the portions nest together, the two portions of the device being aligned along the same axis of direction perpendicular to the pivoting axis of the door.

18 Claims, 2 Drawing Sheets

(56) References Cited

U.S. PATENT DOCUMENTS

| | | | |
|---|---|---|---|
| 2,496,691 A | | 2/1950 | Berry |
| 2,622,283 A | * | 12/1952 | Roos ................................ 49/67 |
| 2,734,765 A | * | 2/1956 | Henderson et al. ........... 293/128 |
| 2,761,718 A | * | 9/1956 | Tool ........................... 292/251.5 |
| 2,767,421 A | * | 10/1956 | Fremstad ........................... 16/85 |
| 2,804,658 A | * | 9/1957 | Hoenicke .......................... 49/65 |
| 2,899,718 A | * | 8/1959 | Engels ............................ 49/460 |
| 3,328,061 A | * | 6/1967 | Whistler, Sr. et al. .......... 292/76 |
| 3,340,649 A | * | 9/1967 | Erlandsen ....................... 49/367 |
| 3,437,735 A | * | 4/1969 | Schaller, Jr. .................. 174/367 |
| 3,472,546 A | * | 10/1969 | Samuels ......................... 293/128 |
| 3,858,357 A | * | 1/1975 | McGuire ........................ 49/460 |
| 4,505,502 A | * | 3/1985 | Tomita ....................... 292/251.5 |
| 5,295,326 A | * | 3/1994 | Dickey ......................... 49/482.1 |
| 5,433,031 A | * | 7/1995 | Dailey .............................. 49/27 |
| 5,528,863 A | * | 6/1996 | Scott ........................... 49/480.1 |
| 5,575,514 A | * | 11/1996 | Troy .............................. 292/340 |
| 5,592,782 A | | 1/1997 | Scott |
| 5,858,287 A | * | 1/1999 | Scott ............................ 264/45.9 |
| 5,933,915 A | * | 8/1999 | El Dessouky et al. ............ 16/82 |
| 6,206,455 B1 | * | 3/2001 | Faubert et al. ................ 296/155 |
| 2006/0021191 A1 | * | 2/2006 | Huang .............................. 16/82 |
| 2010/0162523 A1 | * | 7/2010 | Ferguson .......................... 16/82 |

* cited by examiner

Background Art

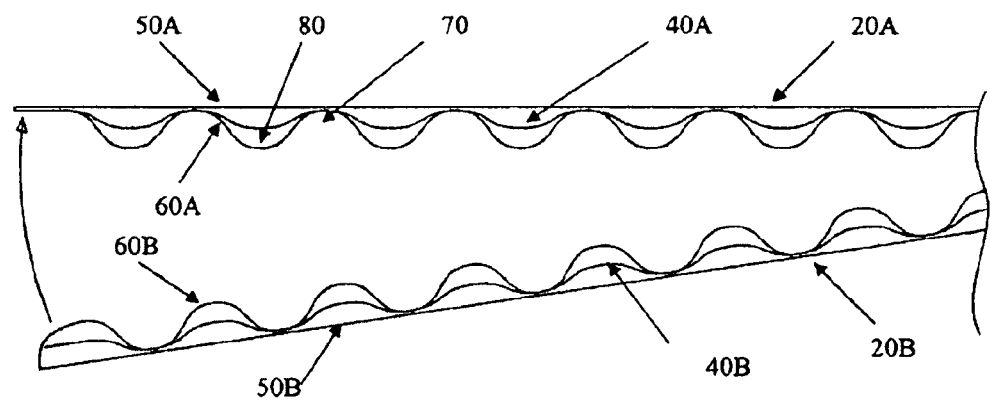
FIG.3
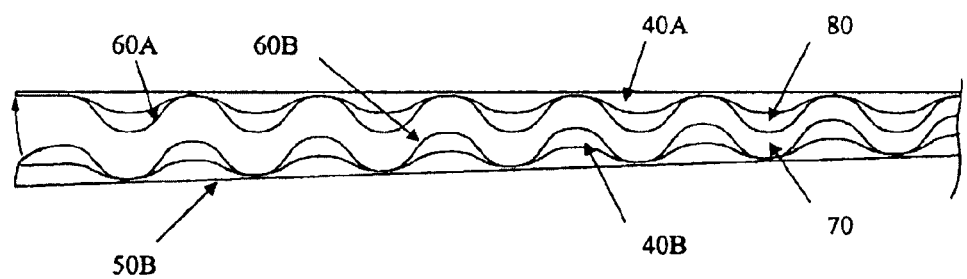
FIG.4
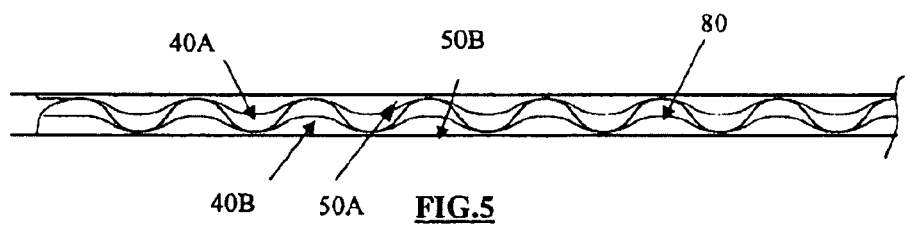
FIG.5
FIG.6           FIG.7

DOOR PROTECTION DEVICE

CROSS-REFERENCE TO RELATED APPLICATIONS

This application is based upon and claims priority under 35 U.S.C. §371 from International Patent Application No. PCT/FR07/00861, filed May 22, 2007 which claims priority under 35 U.S.C. §119(e) from U.S. Provisional Patent Application No. 60/807,937, filed Jul. 21, 2006 and under 35 U.S.C. §119 from French Patent Application No. 06/04563, filed May 22, 2006.

BACKGROUND OF THE INVENTION

Field of the Invention

This invention concerns a device for protection of the door.

This invention relates to any type of door, panel that opens and, more generally, to any panel making it possible to close an opening completely or partially.

More precisely, this invention concerns pivoting doors against which various types of impacts may be exerted: impacts against the walls toward which the doors swing, impacts with moving objects thrown against the said doors or blocking the path of the door, or others . . . . The intensity of the mechanical and acoustic impact depends on the force with which the door or the object is impelled. Mechanical impact may lead to damage to the materials used for the finishing of the door: bending, scratching or other. Furthermore, acoustic impact may cause discomfort in the individuals in the vicinity of the said door.

Moreover, in airplanes, the flight personnel distribute tray meals to the passengers with the aid of meal carts. The carts are kept in compartments arranged in a pantry unit, hereinafter referred to as the unit. The pantry of an airplane ("galley" in English) is the part where food is stored and prepared during the flight. Each compartment of the said unit is closed by a pivoting door.

It should be noted that when deterioration is caused by the handling of the doors of the said units or that of the carts (which can weigh up to about a hundred kilos), this damage can be repaired only during a specific time: that of stopover. Repairs therefore are difficult and costly.

In addition, the airline companies want a rapid repair for the visual comfort of the passengers.

Furthermore, the companies also wish to reduce, or even eliminate, all the noise pollution accompanying a flight. Thus, the acoustic impacts caused with the door of the pantry unit should be minimized. Finally, the esthetic appearance of a cabin is a significant factor: any unsightly damage to the equipment should be eliminated. The outward appearance of the components making up the cabin is part of the selection criteria for airline companies.

FIG. 1 depicts an existing type of unit 1 provided in airplane pantries. The doors 2 (2A, 2B, 2C) of the compartments 3 (3A, 3B, 3C respectively) of the unit commonly are provided with horizontal protection devices 4 (4A, 4B, 4C respectively) composed of thermoplastic materials or of rubber.

The flight personnel gain access to the carts stored inside the compartments 3 by opening the doors 2 as widely as possible, ideally with an angle of opening of 180°. In order to accomplish this, the protection devices 4A, 4B and 4C arranged respectively on each of the doors of the compartments 3A, 3B and 3C are offset vertically in relation to each other and, more particularly, are arranged at different heights on each of the doors. In this way, the protection devices cannot touch and do not hinder the complete opening of the doors.

As FIG. 1 shows, however, the different protection devices 4 form several discontinuous horizontal lines parallel to all the other continuous horizontal lines making up the unit. The lack of horizontal alignment of the protection devices 4 introduces an unsightly discontinuity.

In addition, the rectangular shape of the protection devices 4 presents an angular shape that can slow down the movement of the carts passing close to the pantry unit.

Finally, the acoustic intensity of the impact of a device 4 against a metal door 2 is relatively substantial and represents a discomfort on board.

One object of this invention is to propose a new device for protection of a door making it possible to retain the advantages of the existing devices while providing a more attractive esthetic contour.

SUMMARY OF THE INVENTION

In order to accomplish this, this invention proposes a device for protection of a door pivoting around an axis and, in opening position, fitting against a wall, characterized in that it comprises a part added onto the outer surface of the door and a part added onto the wall, so that in opening position of the door the two parts fit into one another, the two parts of the device being aligned along the same axis in a direction perpendicular to the axis of pivoting of the door.

In this way, the two parts of the device opposite one another do not hinder one another at the time of opening of the door.

In addition, their alignment along the same axis improves the esthetics of the whole.

Furthermore, such an arrangement facilitates the installation of the device on the door and the wall.

The invention thus applies to a whole formed by a door and a wall close to one another.

According to a specific form of the invention, the two parts fit into one another so that in completely open position, the distance between the door and the wall is less than the sum of the thicknesses of the said parts.

The parts have surfaces comprising correspondingly at least one depression and/or one projection so as to interpenetrate in opening position of the door.

According to one characteristic, the said at least one projection comprises a thickness that varies along a direction parallel to the axis of pivoting of the door.

According to a particular embodiment, the two parts comprise corresponding undulating surfaces. The symmetry of the forms and the roundness provided by the said parts makes it possible not to block the advance of the carts and to facilitate the sliding thereof along the doors or their rebound on the doors, According to one characteristic, in complete opening position, the two parts are joined together to form a solid component.

According to another characteristic, the axis of pivoting of the door is vertical and in particular the device is arranged horizontally, that is, the two parts of the device are aligned along the same horizontal axis.

According to another aspect, the invention applies to a device for protection of a door of a compartment, the device being the one briefly explained above, and the wall against which the door fits in opening position is made up of a door and an adjacent compartment.

The invention also concerns doors equipped with this type of device as well as the units, for example the pantry units of an aircraft, equipped with such doors.

More particularly, the invention applies to a door pivoting around an axis and intended to fit in opening position against a wall, characterized in that the said door comprises a part added onto the outer surface of the door and which is intended to fit into a part added onto the wall in opening position of the said door, the door part extending along an axis in a direction perpendicular to the axis of pivoting of the door.

The invention also has as a purpose a unit that comprises a door such as briefly explained above and a wall against which the door fits in opening position.

BRIEF DESCRIPTION OF THE DRAWINGS

Other objects, advantages and characteristics of the invention will become apparent upon reading of the description that is going to follow, presented by way of non-limitative example with reference to the attached drawings in which:

FIGS. 3 to 5 are views from above schematically illustrating different positions of the doors of a unit equipped with a device according to this invention at the time of opening of one of them, FIG. 5 depicting the complete opening position of the said door;

FIGS. 6 and 7 are respectively a side view and a front view of a part of the protection device according to this invention.

DETAILED DESCRIPTION OF THE INVENTION

The protection device is presented in the description that follows in the illustrative and non-limitative context of pantry units in airplanes. The protection device may be used in any other application necessitating a mechanical and/or acoustic protection for a door opening against a wall (outer wall, other door or other).

Figure 2:
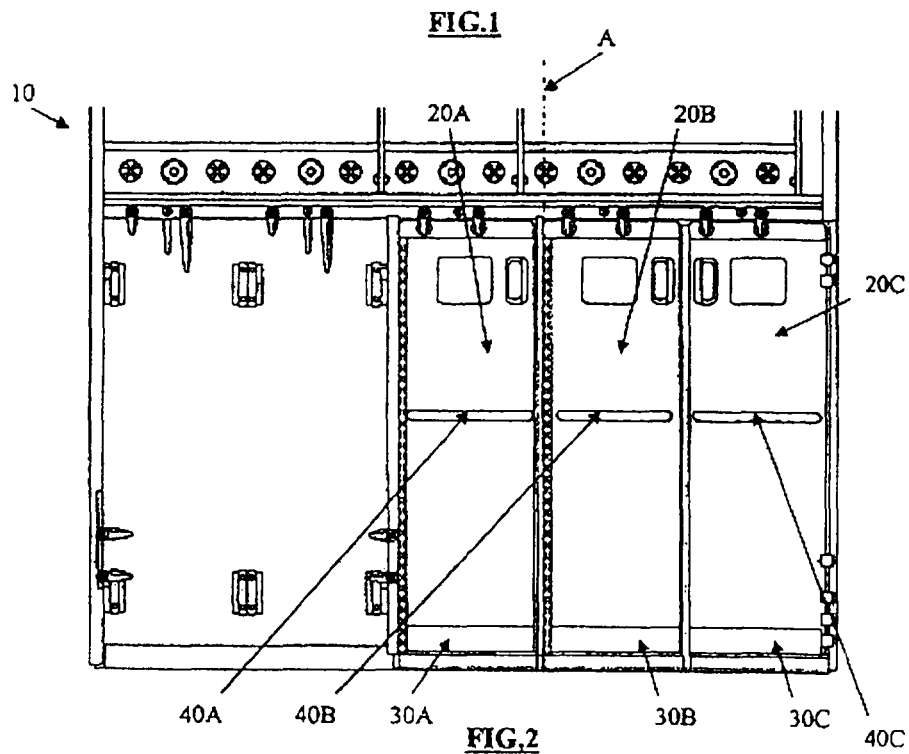
FIG. 2 is a front view of a unit provided with protection devices according to this invention.

As FIG. 2 shows, the units 10 provided in airplane pantries comprise compartments 30 (30A, 30B, 30C) adjacent two by two, of oblong parallelepipedal shape and in which the meal carts are kept. The carts hold tray meals intended for the passengers. The compartments 30 make it possible to maintain the trays at a chosen preservation temperature. The adjacent compartments 30 (30A, 30B, 30C) each are closed by a door 20 (20A, 20B, 20C respectively) pivoting around a vertical axis. In this description, the vertical direction is considered as the direction perpendicular to that of the floor on which the unit 10 is resting. On FIG. 2, the compartment 30B is closed by a door 20B pivoting around a vertical axis A. The door 20B pivots between a closing position, depicted on FIG. 2 and in which the compartment is closed, and a complete opening position in which the door 20B is in contact with the door 20A of the adjacent compartment 30A (FIG. 5).

Protection devices 40A, 40B, 40C according to the invention are added respectively onto the outer surface of the doors 20A, 20B and 20C of compartments 30A, 30B and 30C. The outer surface of a door, of the door 20B for example, is the surface visible to the flight personnel; it is also the surface intended to fit, in opening position of the compartment involved, against a wall, in this case against the door 20A. A protection device 40 extends mainly in a general elongated shape and is made up, for example, of a section of slender form. The longitudinal shape of the device 40 is laid out horizontally and parallel to the horizontal upper and lower edges of the door 20.

As shown on FIGS. 3 to 5, the device 40 comprises two parts 40A and 40B: one part 40B added onto the outer surface of the door 20B and one part 40A added onto the wall 20A toward which the door 20B pivots. In opening position of the door 20B, the parts 40A and 40B fit into one another, thus making it possible to open the door 20B even more.

In this embodiment illustrated on FIG. 2, the wall is made up of the door 20A of the unit 1. As FIGS. 3 to 5 show, the respective surface 50A, 50B of each part 40A and 40B of the device 40 respectively joined to the door and to the wall is flat in order to facilitate fastening of the parts 40A and 40B respectively onto the doors 20A and 20B. This fastening is accomplished by any type of known means (gluing, screwing and/or other).

The surface 60A, 60B of each part 40A and 40B of the device 40, opposite the surface 50A, 50B, is the surface intended to rest, in opening position, respectively against the surface 60B, 60A of the corresponding part 40B, 40A. The surface 60 of each part 40A and 40B of the device 40 comprises at least one depression and/or one projection. In the form illustrated on FIGS. 3 to 5, the device 40 comprises, at the surface 60, a succession of depressions 70 and projections 80.

The depression or depressions and/or the projection or projections respectively of the part 40A and of the part 40B have complementary shapes. In complete opening position, the complementary shapes are joined together to form a component with a thickness less than the sum of the thicknesses of the parts 40A ad 40B as depicted on FIG. 5. The thickness of a part 40A (40B respectively) is the maximum orthogonal distance existing between the surface 50A (50B respectively) and the surface 60A (60B respectively). Thus, in complete opening position, the parts 40A and 40B complement one another so that the maximum orthogonal distance between the surface 50A of the part 40A and the surface 50B of the part 40B is less than the sum of the thicknesses of the parts 40A and 40B. In particular this distance is less than the double thickness of devices 4 of known type such as the one shown on FIG. 1 and which are superposed in the case of a horizontal alignment of these devices 4 on each of the doors 2A, 2B and 2C. As a matter of fact, the devices 4 of known type are solid, homogeneous, oblong parallelepipedal moldings just as the surface 6 opposite the surface 5 added to the door of the said molding is flat. For this reason, in opening position, the moldings situated opposite one another hinder the complete opening of the door.

Figure 1:
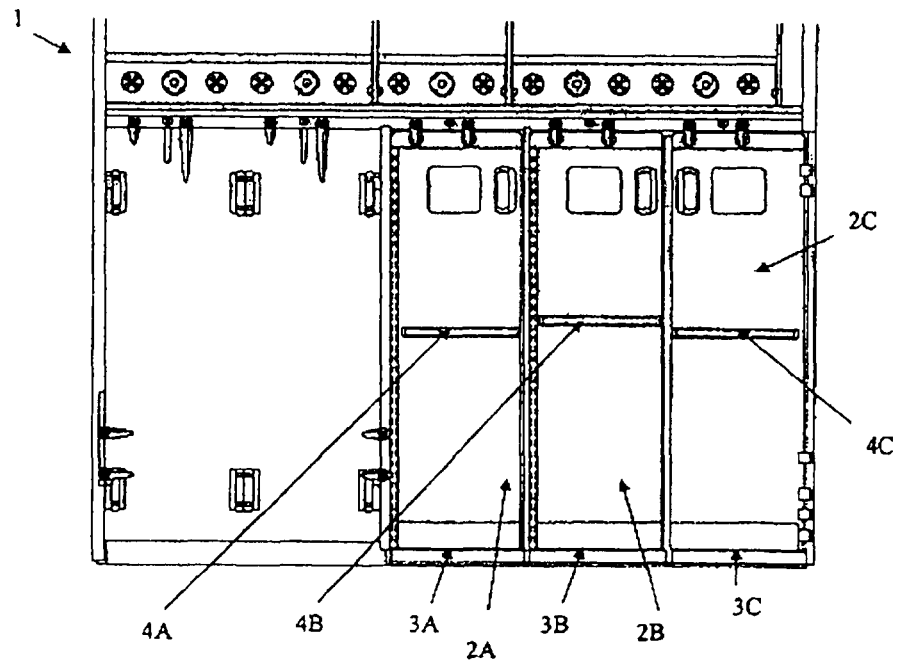
FIG. 1 is a front view of a unit provided with protection devices of known type.

In the embodiment depicted on FIG. 5, in opening position, the parts 40A and 40B together form a component more or less with the thickness of a single device 4 of existing type (such as depicted on FIG. 1). More precisely, the parts 40A and 40B, in opening position of the door 20B, form a section with thickness practically equivalent to the greatest thickness of a projection of a part 40A or 40B.

In this way, the parts 40A and 40B are arranged on the same axis perpendicular to the axis of pivoting of the door 20B, in this case horizontal. It therefore is not necessary to offset them along the axis of pivoting, that is, vertically, in order to prevent them from colliding at the time of opening of the door and forming an excess thickness restricting the clearance of the door. The parts of the device with complementary shapes therefore can be added at identical heights on the doors of the unit, which facilitates their positioning. In addition, this invention improves the esthetic appearance of the pantry unit by providing continuous, thus more harmonious, lines.

The depressions and projections may have any type of shapes allowing the interpenetration of the two parts 40A and 40B of the device 40. Thus, the projection has, for example, a rectangular shape for a toothed or comb surface, a triangular shape, a semicircular, oval or other shape. The surface 60 also may have a complex shape as soon as it comes into correspondence with the surface against which it fits in opening position and it conforms to the fitting-in characteristics previously described.

In the embodiment illustrated on FIGS. 3 to 7, the depressions and projections are of rounded shape and thus form an undulating surface 60. The rounded shape has the advantage of presenting only slight friction during the advance of a cart parallel to the unit. The shape of the surface 60 makes it possible to have the cart slide or rebound on the doors of the unit depending on the angle of approach of the cart in relation to the doors.

In the embodiment illustrated on FIGS. 3 to 5, each of the projections 80 has a thickness variable vertically and, for example, several thicknesses: a maximum thickness at the center of the projection and thicknesses less than the maximum thickness on the upper and lower edges. This variation in thickness is visible on FIG. 7, which is a front view of a part 40 of the device. The depression provided in correspondence with the projection follows the surface of the central portion of maximum thickness of the projection but, in the embodiment illustrated, does not comprise concave portions along the edge in order to follow the contours of the upper and lower portions of lesser thickness of the projection.

Thus, any type of surface may be provided with horizontal, vertical or other fitting-in means.

FIG. 6 depicts the device 40 seen from the side and shows the semi-oval contour of the projections of the parts 40A and 40B.

Each of the parts making up the device 40 is composed of a cushioning material such as a thermoplastic material, an elastomer or other. The cushioning material used provides numerous advantages:
- cushioning the impacts between the doors;
- cushioning the impacts resulting from meal carts handled in the vicinity of the doors; the devices also make it possible, because of their elasticity, to move the carts away by rebound;
- the smooth surface provided by this type of material allows the parts of the device made of this material not to constitute obstacles or generate friction likely to hinder the advance of the carts.

Furthermore, the material used is a material for mechanical but also acoustic cushioning. As a matter of fact, the impact between doors takes place precisely between two protection devices and no longer between a protection device and a metal door. The acoustic level of the impact therefore is reduced.

The invention claimed is:

1. A device for protection of a door pivoting around an axis and fitting in an opening position against a wall, comprising:
   a door part added onto a plane of an outer surface of the door; and
   a wall part added onto a plane of the wall, so that in an open position of the door the door part and the wall part fit into one another,
   the door part and the wall part each being aligned along the same axis in a direction perpendicular to the axis of pivoting of the door, the door part including at least two projections and at least two depressions extending in a direction perpendicular to the plane of the outer surface of the door, the wall part including at least two projections and at least two depressions extending in a direction perpendicular to the plane of the wall, each of the door part and the wall part being made of a cushioning material, the at least two projections and at least two depressions of the door part being arranged in a line along the direction perpendicular to the axis of pivoting of the door, and the at least two projections and at least two depressions of the wall part being arranged in a line along the direction perpendicular to the axis of pivoting of the door, and
   the door part includes the at least two projections extending in an extension direction that is the direction perpendicular to the plane of the outer surface of the door, the wall part includes the at least two projections extending in an extension direction that is the direction perpendicular to the plane of the wall, and
   each projection includes a thickness in a direction that is perpendicular to the respective extension direction of the projection and that is perpendicular to the respective line along which the projection is arranged and wherein said direction is parallel to one of said outer surface of the door or said plane of the wall, and the thickness varies going along the respective line along which the projection is arranged.

2. The device according to claim 1, wherein the door part and the wall part fit into one another so that in the open position, the distance between the door and the wall is less than the sum of thicknesses of the door part and the wall part.

3. The device according to claim 1, wherein each projection has a thickness that varies along a direction parallel to the axis of pivoting of the door.

4. The device according to claim 1, wherein the door part and the wall part comprise corresponding undulating surfaces.

5. The device according to claim 1, wherein in the open position, the door part and the wall part are joined together so as to form a solid component.

6. The device according to claim 1, wherein the axis of pivoting of the door is vertical.

7. The device according to claim 1, wherein the wall is a door of an adjacent compartment.

8. The device according to claim 1, wherein the door part is elongated in a direction parallel to the plane of the outer surface of the door and perpendicular to the axis of pivoting of the door, the at least two projections and at least two depressions of the door part are arranged in a line along the direction parallel to the plane of the outer surface of the door, the wall part being elongated in a direction parallel to the plane of the wall and perpendicular to the axis of pivoting of the door, and the at least two projections and at least two depressions of the wall part being arranged in a line along the direction parallel to the plane of the wall.

9. The device according to claim 1, wherein at least one of the door part and the wall part is a part of a pantry unit of an airplane.

10. The device according to claim 1, wherein in a closed position of the door the door part and the wall part are spaced apart, and in the closed position of the door the at least two projections and at least two depressions of the door part and the at least two projections and at least two depressions of the wall part extend along a same line.

11. A door pivoting around an axis and intended to fit in an opening position against a wall, comprising:
   a door part added to a plane of an outer surface of the door and configured to fit into a wall part added onto a plane of the wall in an open position of the door, the door part of the door extending along an axis in a direction perpendicular to the axis of pivoting of the door, the door part including at least two projections and at least two depressions extending in a direction perpendicular to the plane of the outer surface of the door, the wall part including at least two projections and at least two depressions extending in a direction perpendicular to the plane of the wall, each of the door part and the wall part being made of a cushioning material, the at least two projections and at least two depressions of the door part being arranged in a line along the direction perpendicular to the axis of pivoting of the door, and the at least two projections and at least two depressions of the wall part being arranged in a line along the direction perpendicular to the axis of pivoting of the door, and the door part includes the at least two projections extending in an extension direction that is the direction perpendicular to the plane of the outer surface of the door, the wall part includes the at least two projections extending in an extension direction that is the direction perpendicular to the plane of the wall, and each projection includes a thickness in a direction that is perpendicular to the respective extension direction of the projection and that is perpendicular to the respective line along which the projection is arranged and wherein said direction is parallel to one of said outer surface of the door or said plane of the wall, and the thickness varies going along the respective line along which the projection is arranged.

12. A unit, comprising:

a door according to claim 11 and a wall against which the door fits in the open position.

13. The unit according to claim 12, wherein the wall part and the door part form a section with a thickness substantially equal to a greatest thickness of a projection of the wall part or the door part when the door is in the open position.

14. The unit according to claim 12, wherein the wall part and the door part are each made of a thermoplastic material or an elastomer.

15. The unit according to claim 12, wherein the projections in the door part fit into the depressions in the wall part and the projections in the wall part fit into the depressions in the door part when the door is in the open position.

16. The door according to claim 11, wherein the door part is elongated in a direction parallel to the plane of the outer surface of the door and perpendicular to the axis of pivoting of the door, the at least two projections and at least two depressions of the door part are arranged in a line along the direction parallel to the plane of the outer surface of the door, the wall part being elongated in a direction parallel to the plane of the wall and perpendicular to the axis of pivoting of the door, and the at least two projections and at least two depressions of the wall part being arranged in a line along the direction parallel to the plane of the wall.

17. The door according to claim 11, wherein at least one of the door part and the wall part is a part of a pantry unit of an airplane.

18. The door according to claim 11, wherein in a closed position of the door the door part and the wall part are spaced apart, and in the closed position of the door the at least two projections and at least two depressions of the door part and the at least two projections and at least two depressions of the wall part extend along a same line.

* * * * *